May 19, 1936.     R. K. LEE     2,041,555

COMBINATION FAN AND VIBRATION DAMPER

Filed Jan. 19, 1934

INVENTOR.
ROGER K. LEE.
BY
Harness, Lind, Patel & Harris
ATTORNEYS.

Patented May 19, 1936

2,041,555

UNITED STATES PATENT OFFICE 2,041,555

COMBINATION FAN AND VIBRATION DAMPER

Roger K. Lee, Highland Park, Mich., assignor to Chrysler Corporation, Detroit, Mich., a corporation of Delaware Application January 19, 1934, Serial No. 707,320

2 Claims. (Cl. 230—272)

This invention relates to a combined vibration damper for the crank shaft of an internal combustion engine and fan for the cooling system thereof.

One of the main objects of the invention is to utilize the blades of a fan and associated structure or other air propelling means of an internal combustion engine cooling system as an inertia member of a crank shaft vibration damper.

Other objects of the invention are to provide an improved fan for an internal combustion engine cooling system; to provide a device of this character having a hub portion non-rotatably securable to a crank shaft and having blades which are yieldably connected with the hub portion and adapted to rotate relative thereto within a limited range; to provide non-metallic yieldable connecting means having sound insulating properties between blades of the fan and its hub portion for intercepting the direct transmission of the sound vibrations set up in the blades, during operation, to the crank shaft and other structures of an engine; to provide yieldable material of this character between the blades and its hub portion which also intercepts the direct transmission of vibratory movement of the parts of the engine to the fan blades, and thereby prevents destructive movement of the fan blades; to provide non-metallic resilient connecting means between the fan blades and the hub structure of a fan of this character which is so constructed and arranged as to allow bodily movement of the blades to lessen or prevent distortion of the parts of the blades by force naturally or accidentally opposing their normal rotative movement; and to provide a resilient element of this character, preferably comprising rubber, which has a deflection rate so predetermined with respect to the moment of inertia of the fan as to insure proper damping of crank shaft vibrations by bodily movement of the fan blades.

A further object of the invention is to provide blade units in a fan of this kind which have diametrically opposite vanes; to provide blade units which are substantially balanced with respect to the axis of rotation of the fan; to provide means for yieldably independently securing each of a pair of such blade units to a fan hub structure in desired angular relationship and in such a manner as to allow independent bodily movement of each unit relative to the other and to the hub structure; and to provide independent resilient connecting elements between each blade unit and the fan hub structure which may be individually predetermined in characteristics to correspond with the properties of blade units of diverse constructions, dimensions and contours.

An illustrative embodiment of the invention is shown in the accompanying drawing, in which.

Figure 1:
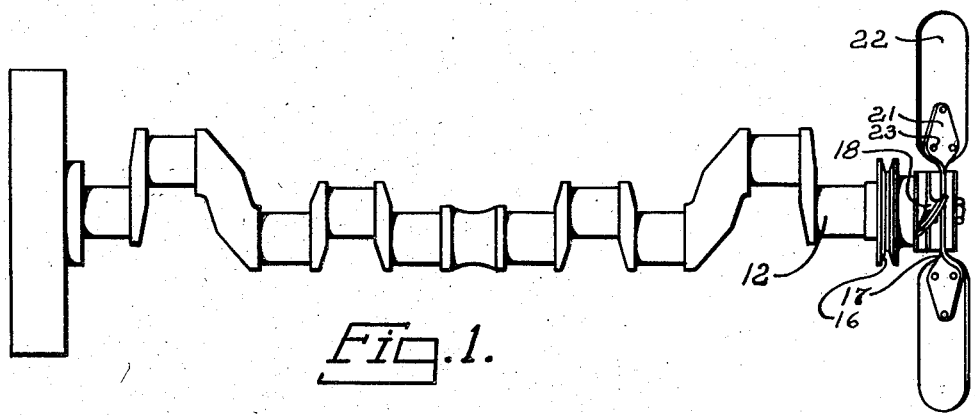
Fig. 1 is a side elevational view of an internal combustion engine crank shaft which is provided with a combined fan and vibration damper embodying my invention.
Figure 2:
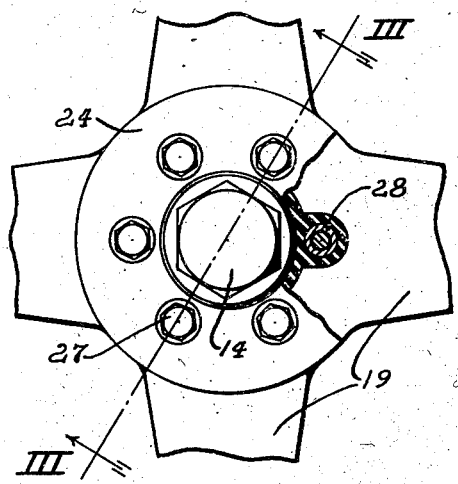
Fig. 2 is an enlarged, fragmentary, front elevational view of the combined fan and vibration damper appearing in Fig. 1, showing parts thereof broken away to disclose the underlying structure.
Figure 3:
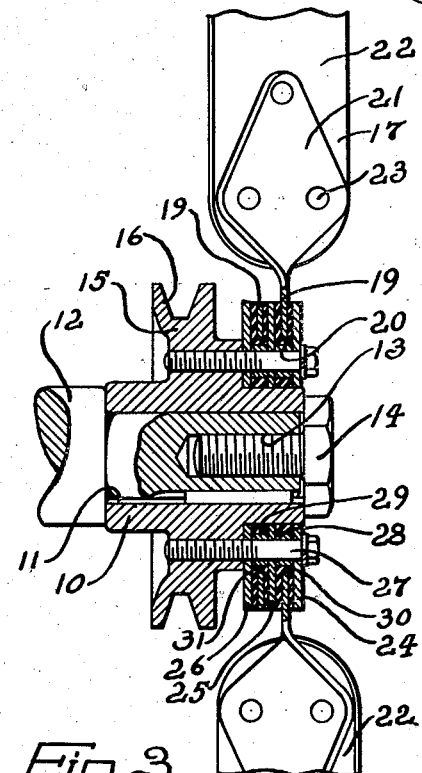
Fig. 3 is a transverse, sectional view taken on the line III—III of Fig. 2.

In the form shown, my combined fan and crank shaft vibration damper includes a hub 10 provided with splines 11 by which it may be non-rotatably mounted on the front end of a crank shaft 12. The crank shaft 12 has an axially extending aperture 13 formed in its front extremity in which is threaded a bolt 14 having a head portion engaging an extremity of the hub 10 for preventing axial displacement thereof. Integrally formed on the hub 10 is a radial flange 15 having a peripheral groove 16 providing a pulley for cooperating with a belt (not shown) for driving any accessory or auxiliary apparatus such as a generator or water pump of the type with which internal combustion engines of vehicles are conventionally provided.

A fan comprising axially spaced fan blade units 17 and 18 is mounted on the hub 10. This fan may be relied upon to cause the flow of air through a radiator core (not shown) of the type conventionally provided in motor vehicles, and disposed in advance of the front end of the engine thereof. Each fan blade unit preferably comprises a central sheet metal stamping 19 which is provided with an aperture 20 and with outwardly extending diametrically opposite flanges 21 on which fan blades 22 are rigidly fixed by rivets 23 or other suitable means. The flanges 21 are preferably bent to conform with the inclination or pitch of the blades 22.

In the illustration shown, each blade unit comprises two blades which are located in any desired angular relationship but preferably diametrically opposite each other and preferably balanced with respect to the central axis of the fan about which they revolve. The blade unit 17 is shown to extend substantially perpendicular to the blade unit 18, but this angular relationship may be varied as desired.

Both the blade units 17 and 18 are permanently assembled together in a unitary structure between axially spaced metal ring shaped plates 24, 25, and 26 which are provided with registering apertures for receiving bolts 27 by which the fan is detachably secured to the hub 10. The plates 24, 25, and 26 overlap the central stamping 19 of the blade units 17 and 18 and they are held in spaced relation by collars 28 and 29 surrounding the bolts 27. The central stamping of the blade unit 17 extends into the space between the plates 24 and 25, and the central stamping of the blade unit 18 extends into the space between the plates 25 and 26. All portions of the blade unit 17 are insulated from the portions of the plates between which it extends by a resilient element 30 having sound insulating properties and preferably comprising rubber which is integrally bonded by vulcanization to the adjacent surfaces of the central stamping 19 of the blade unit 17 and the plates 24 and 25. The central stamping of the blade unit 19 is likewise insulated from the plates 25 and 26 between which it extends by a similar resilient element 31 which is also integrally bonded to the adjacent surfaces of the stamping 19 and plates between which it is disposed. The rubber elements 30 and 31 interrupt the direct transmission of sound vibrations from the fan blades to the crank shaft and the engine structure with which the latter is conventionally associated, and they also interrupt the direct transmission of vibrations created by the moving parts of the engine to the fan blades, thereby preventing destructive oscillatory movement of the blades of the fan and greatly reducing fan noise.

Each fan blade unit is permitted to move relative to the hub structure and crank shaft within a limited range, and in so doing, these fan blade units serve as inertia elements in damping crank shaft vibrations. The moment of inertia of the blade units and the deflection rate of the rubber connecting elements by which they are yieldably connected with the crank shaft are preferably predetermined with respect to each other in such a manner as to guard against the occurrence of a synchronized or phased relationship between oscillations of the fan unit inertia elements and the vibrations, preferably of a distortional nature, of the crank shaft. By virtue of this construction, impulses created by movement of the fan blade inertia elements relative to the crank shaft are imposed upon the crank shaft in a non-synchronous and out-of-phase relation to the vibrations of the latter thereby effectively damping crank shaft vibrations.

The fan blade units are combined in a unitary structure which is well adapted for the vulcanizing treatment required to form rigid bonds between the rubber elements 30 and 31, the plates 24, 25, and 26 with which they are associated and the blade units. This unitary structure can be readily removed and replaced from the crank shaft without requiring removal of the hub 10 and other parts of the structure so as to enable the making of convenient changes and substitutions of fans.

Although but one specific embodiment of the invention is herein shown and described, it will be understood that various changes in the size, shape and arrangement of parts may be made without departing from the spirit of my invention, and it is not my intention to limit its scope other than by the terms of the appended claims.

What I claim is:

1. A fan for an internal combustion engine cooling system including a member securable to a driving element, a pair of fan blade units associated with said member and movable independently relative thereto and to each other, and resilient elements fixed independently to said member and to each of said units respectively providing resilient driving connections between each of said units and said member.

2. A fan for an internal combustion engine cooling system including a member securable to a driving element, a pair of fan blade units associated with said member and movable independently relative thereto and to each other, and a pair of rubber elements each permanently fixed to said member and one permanently fixed to each of said units respectively for independently drivingly connecting each of said units with said member.

ROGER K. LEE.